United States Patent
Ansbro et al.

(10) Patent No.: US 7,990,613 B2
(45) Date of Patent: Aug. 2, 2011

(54) DEPTH ENHANCING SCREEN

(75) Inventors: Catherine Ansbro, Boyle (IE); Eamonn Ansbro, Boyle (IE); John Braithwaite, Dalserf (GB)

(73) Assignee: RealView Innovations Limited (IE)

( * ) Notice: Subject to any disclaimer, the term of this patent is extended or adjusted under 35 U.S.C. 154(b) by 342 days.

(21) Appl. No.: 12/248,640

(22) Filed: Oct. 9, 2008

(65) Prior Publication Data

US 2009/0097113 A1 Apr. 16, 2009

(30) Foreign Application Priority Data

Oct. 12, 2007 (EP) .................................. 07118417
Oct. 12, 2007 (IE) .................................. S2007/0745

(51) Int. Cl.
*G03B 21/56* (2006.01)
*G02B 3/08* (2006.01)
(52) U.S. Cl. .................. 359/451; 359/743; 359/900
(58) Field of Classification Search .................. 359/451, 359/742–743, 460, 900
See application file for complete search history.

(56) References Cited

U.S. PATENT DOCUMENTS

| | | | | |
|---|---|---|---|---|
| 5,583,702 | A * | 12/1996 | Cintra | 359/743 |
| 5,790,322 | A * | 8/1998 | Kameda et al. | 359/742 |
| 6,313,946 | B1 * | 11/2001 | Petitto et al. | 359/451 |
| 6,678,098 | B2 | 1/2004 | Amery et al. | |
| 7,633,684 | B1 * | 12/2009 | Lo | 359/743 |
| 2010/0007846 | A1 * | 1/2010 | Fermigier et al. | 351/163 |

OTHER PUBLICATIONS

Building a Collimated Display for PC Games; http://www.rickleephoto.com/rlcoll.htm; first posted circa 1999.

* cited by examiner

*Primary Examiner* — Christopher Mahoney
(74) *Attorney, Agent, or Firm* — Overhauser Law Offices, LLC

(57) ABSTRACT

The present disclosure relates to a depth-enhancing screen for producing a simulated 3D image. The screen comprises a multi-curved Fresnel lens which when viewed in cross-section along the or each longest line linking two points on the edge of the lens, has a curved cross-section with an apex in the central region of the lens, and wherein each end of the curve flattens before it reaches the edge of the lens.

22 Claims, 4 Drawing Sheets

DEPTH ENHANCING SCREEN

FIELD OF THE INVENTION

The present disclosure relates to a depth-enhancing screen for producing an image having enhanced depth or a simulated three-dimensional effect.

BACKGROUND TO THE INVENTION

Depth perception is the visual ability to perceive the world in three dimensions. Humans (and other animals) use a variety of monocular cues (that is, cues available from the input of just one eye) and binocular cues (that is, cues that require input from both eyes) to perceive depth.

Motion parallax is a type of monocular cue which affects depth perception. When an observer moves, the apparent relative motion of several stationary objects against a background gives hints about their relative distance. These subtle movements by the observer work in the real world for providing a better understanding of depth. However, when viewing images on a flat television or computer screen, such movements will not facilitate depth perception because there is no relative motion between objects shown in the two-dimensional image.

Stereopsis or retinal disparity is a type of binocular cue which affects depth perception. Information derived from different projection of objects on to each retina is used to judge depth. By using two images of the same scene obtained from slightly different angles, it is possible for the brain to calulate the distance to an object. If the object is far away, the retinal disparity will be small. On the other hand, if the object is close, the retinal disparity will be large. Again, this effect works in the real world to give a viewer a better understanding of depth, but does not work with a flat two dimensional screen because all objects on the screen appear to be at the same distance from the viewer.

Stereoptic effect may, however, be used to "trick" the brain into perceiving depth in a two dimensional image, such as a "Magic Eye" picture or a stereoscopic photo. Similarly, stereoptic effect may be used to produce a simulated three-dimensional image (that is, an image having depth cues) from a two-dimensional image such as an image on a flat television or computer screen, as described in European Patent Application Publication No. EP 1 636 631. This document describes an apparatus comprising a flexible Fresnel lens curved in two transverse directions so as to create a substantially convex lens. The apparatus may be mounted, for example, in front of a television screen or computer monitor 2 as shown in FIG. 1 to produce a simulated three-dimensional image of the two-dimensional image displayed on the screen. The Fresnel lens 3 is spaced apart from the screen 2 and is curved in a first plane (the x-z plane) and a second plane (the y-z plane) so as to form a Fresnel lens having two planes of curvature. As shown in the drawing, if a cross-section of the lens were taken in the x-z plane, the cross-section of the lens would be curved or arcuate in shape across its entire width. Similarly, if a cross-section were taken in the y-z plane, the cross-section would also be curved or arcuate in shape. As the x- and y-planes are, by definition, orthogonal to one another, there are thus two orthogonal planes in which the lens is arcuate in cross-section. The Fresnel lens may be flexible and positioned within a mount configured with adjustable tensioning members so as to tune the optical characteristics of the Fresnel lens so as to optimise production of the simulated three-dimensional image.

Because the Fresnel lens is curved in two transverse planes, slightly different images are received by the left and right eyes of the viewer, producing a stereoptic effect, which is interpreted by the brain so that the image appears to have depth, that is, the image appears more three-dimensional than would otherwise be the case.

In EP 1 636 631, the corners of the Fresnel lens (for a rectangular lens) are fixed in position in order to achieve the required curvatures. Stresses are introduced into the curved Fresnel lens at the fixed points and this also produces stresses in other parts of the lens including along the edges of the lens between the fixed points. A device as described in the above patent application will produce a distorted image at these stress zones including many zones of the overall image. For example, in the case of a rectangular screen, the four corners—the areas of the screen furthest away from the viewer—will show most pronounced distortions, and the four edges will show a "bowing" effect. The image in these areas will not be straight but will bow outwards away from the centre of the Fresnel lens as shown in FIG. 2. In reality, the bowing effect may be even more pronounced, and may extend over a greater portion of the screen than in the example shown in FIG. 2.

The present disclosure is directed to overcoming, or at least reducing the effects of, one or more of the problems set forth above.

SUMMARY

Accordingly the present disclosure provides a depth-enhancing screen for producing a simulated 3D image, comprising:

a multi-curved Fresnel lens which when viewed in cross-section along the or each longest line linking two points on the edge of the lens, has a curved cross-section with an apex in the central region of the lens, and wherein each end of the curve flattens before it reaches the edge of the lens.

The term "longest line" when used herein is intended to mean the longest straight line on the surface of the lens when the lens is flat.

The term "flattens" when used herein is intended to mean approaching but not necessarily reaching flat, although the edge of the lens may reach flat. Preferably the ends of the curved cross-section are curved, but the degree of curvature of the cross-sectional curve decreases towards the ends, i.e. the radius of curvature at the ends is less that the radius of curvature approaching the apex. Preferably the difference in the degree of curvature is considerable.

According to one embodiment of the present disclosure, the Fresnel lens is polygonal in shape when flat. The Fresnel lens may be square in shape when flat and comprise two longest lines, each line linking diagonally opposite corners of the lens. The Fresnel lens may be rectangular when flat and comprise two longest lines, each line linking diagonally opposite corners of the lens. Alternatively the Fresnel lens may be triangular in shape and comprise three longest lines, each line linking adjacent corners of the lens.

In some embodiments of the present disclosure, the Fresnel lens comprises at least one curved edge, and/or at least one rounded corner. The corners of the lens may alternatively be flat. It will be appreciated that the terms "square", "rectangular", "triangular" and "circular" encompass substantially square, rectangular, triangular and circular shaped lenses. The lens when flat may be any regular or irregular shape. For example, a lens having rounded corners and curved sides may be used.

The Fresnel lens may be circular in shape when flat and comprise multiple longest lines, wherein each longest line is a diameter of the circle.

In at least one embodiment of the present disclosure the lens may have a curved cross-section when viewed in cross-section along a second line substantially perpendicular to the longest line, the second curve having an apex in the central region of the lens, and wherein each end of the second curve flattens before it reaches the edge of the lens.

The Fresnel lens may be oval in shape when flat wherein the longest line is the oval's major axis and the second line is the oval's minor axis.

The present disclosure further provides a depth-enhancing screen for producing a simulated 3D image, comprising: a multi-curved Fresnel lens which when viewed in cross-section along two intersecting lines linking two points on the edge of the lens, has a curved cross-section with an apex in the central region of the lens, and wherein each end of the curve flattens before it reaches the edge of the lens.

It will be appreciated that the Fresnel lens in the screen of the present disclosure therefore has at least two primary curvatures, wherein the primary curvatures are arranged such that there are at least two planes transverse to one another in which the cross section of the Fresnel lens is arcuate in shape.

The primary curvatures in the lens are arranged such that there are two intersecting or transverse planes in which the lens has an arcuate or curved cross-section. These planes may be orthogonal (or substantially orthogonal), that is, at right angles to one another. There may be several transverse or intersecting planes in which the lens has a curved cross-section. The primary curvatures may be arranged in a similar manner as described above with reference to FIG. 1.

The introduction of secondary curvatures into the Fresnel lens reduces or eliminates distortion of the image, while preserving the enhanced-depth effect, thereby giving an improved depth-enhanced image. The secondary (or modified) curvatures introduced at the outer portions of the lens have a positive effect on image quality over an unexpectedly large area of the lens. Because the secondary curvatures are introduced into the outer portions of the lens only, they do not interfere with the image area to any appreciable extent. However, the distortion-minimising effects of the secondary curvatures extend to a large area of the screen. Thus, the degree of distortion in the depth-enhanced image is reduced considerably, without a corresponding reduction in image size.

Preferably, the Fresnel lens is arranged, in use, such that the lensed side is oriented towards a display screen, such as a television or computer monitor, and the non-lensed (or smooth) side is oriented towards a viewer. The Fresnel lens may be formed from a flexible material, such that the curvatures may be adjusted or tuned. The primary curvatures are such that the lens is (physically) convex towards the viewer. The surface of the lens may be described as substantially dome or "cushion" shaped, depending on the number of primary curvatures introduced. As an example, in one embodiment where the lens is square in shape when flat, the centre or central region of the lens lies in a first plane (parallel to the x-y plane shown in FIG. 1), with the corner regions of the lens lying in a common second plane, parallel to but spaced apart from the first plane. Each edge of the lens is therefore curved, with the apex equidistant between the two corners. The apex of the edge lies in a third plane, parallel to but lying between the first and second planes. The unconstrained corners of the lens may lie in the second plane or may lie in a further parallel plane.

The secondary curvature may be introduced into the Fresnel lens by modifying the primary curvature near the edges of the lens. For example, a primary curvature could be achieved by means of an outward force (that is, towards the viewer) applied to central portions of the Fresnel lens, such as by tensioning members or supports, and an opposing inward force (that is, away from the viewer) applied to the corners or edges of the lens, such as by a fastener, support or the like. Different strength forces may be applied to different regions of the lens so that the resultant shape may not be uniform. In the present present disclosure, the secondary curvature may be achieved by applying the opposing inward force to the Fresnel lens near, but not at, the edges thereof, that is, by moving the points of application of the inward force away from the corners/edges of the lens. Because the outer portion of the lens is now effectively "free-floating", the areas of the stress at the corners and edges of the lens are eliminated or significantly reduced in area and severity. The introduction of a secondary curvature (which has a longer radius of curvature) relieves the stresses caused by the primary curvature at the corners. The inward force may be applied by attaching the lens to a frame at a point spaced from an edge thereof to modify the primary curvature.

An advantage of this arrangement is that, because the outer portions of the lens are unconstrained and thus subjected to little or no stress, the distortion of the overall image is reduced.

For example, the curvatures may be introduced into the Fresnel lens by means of supports provided along the edges of the Fresnel. The curves in the Fresnel lens may be achieved by application of forces to both surfaces of the lens. For a rectangular lens, a first support may be may be provided on the frame approximately at the midpoint of each edge of the lens and a further support may be provided at points spaced from the corners of the lens to provide the inward force. The opposing forces exerted on the Fresnel lens by the supports will cause the lens to exhibit primary curvatures in two orthogonal planes or directions and secondary curvatures in each plane at the outer portions near the corners of the lens. Preferably the forces are applied in at least one region adjacent an edge of the lens. The at least one region may be at the edge or near the edge of the lens.

For a polygonal lens, on one face of the lens the forces are preferably applied either side of each corner of the lens, both forces being applied to the same face of the lens. This leaves the actual corners of the lens unconstrained.

In another embodiment, the Fresnel lens is circular and a pair of concentric circular frames or rings is provided, such that each frame is in contact with one surface of the lens. The smaller of the two frames is in contact with the lensed side of the Fresnel and the larger frame is in contact with the smooth surface of the Fresnel. The frames are urged towards one another (for example, by means of a clamping arrangement) in order to exert opposing forces on the lens to impart a primary curvature (in a plurality of planes/directions) to the lens at a central portion thereof and a secondary curvature to the lens at an outer portion thereof. Preferably each frame is in contact with one surface of the lens, the frames arranged such that the first frame exerts a force on a first surface of the lens, and the second frame exerts a force on the other surface of the lens to obtain the lens's cross-sectional curves. It will be appreciated that each force requires a component perpendicular to the surface of the lens. The lens exhibits a plurality of primary curvatures at a central portion thereof, so that it is substantially dome shaped. The larger ring is smaller in diameter than the Fresnel lens so that the inward force on the Fresnel lens is applied near, but not at, the edge of the lens. The portion of the lens outside the rings exhibits a flattening.

According to another arrangement, the frame may comprise a rim or lip and the Fresnel lens may be mounted in the frame such that the rim or lip shapes an edge of the lens to impart a primary and/or secondary curvature to the lens. The rim may have a primary curvature at a central portion thereof and a secondary curvature at an outer portion thereof. The rim may extend along the entire edge of the Fresnel lens. Alternatively, one or more rim segments or groove segments may be provided along the edge of the Fresnel lens. In another alternative embodiment, a groove may be provided in the frame so that an edge of the Fresnel lens may be inserted into the groove and retained in the desired shape.

In various embodiments, the primary curvatures may be introduced by means of rims, grooves, grove segments or rim segments and the secondary curvatures may be introduced by means of contact points or fasteners spaced from the corners or edges of the lens or by rims, grooves or rim segments. By "rim, groove, groove segment or rim segment" we mean that the rim or groove need not be continuous. It may comprise a plurality of individual contact points. Similarly, supports may be used to introduce the primary curvature and rim segments may be located at outer portions of the frame to shape the outer portions of the lens into secondary curvatures.

In one embodiment, the Fresnel lens is rectangular when flat and the frame is rectangular, and a rim or rim segment is provided on each side of the frame to shape the corresponding edge of the lens.

In use, the screen may be arranged such that the outer portion (having a secondary curvature) of the lens is not visible to the user. For example, the screen may comprise a frame which covers or masks the outer portion of the lens. However, the curve modification will reduce distortion in the parts of the lens which remain exposed to the viewer.

DETAILED DESCRIPTION OF THE DRAWINGS

Figure 1:
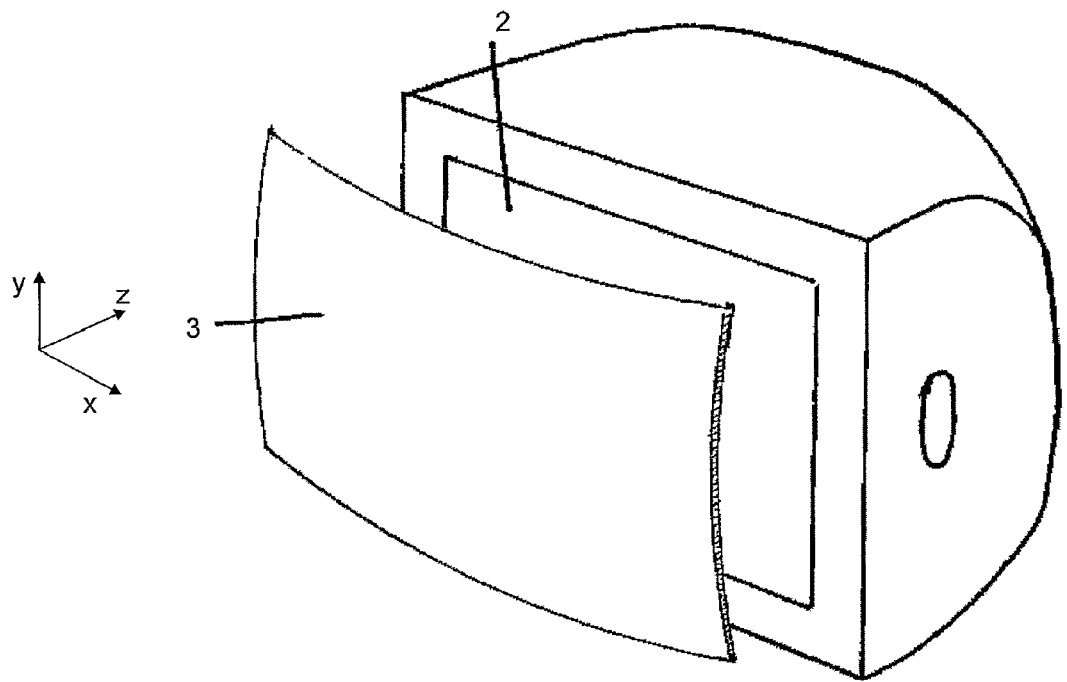
FIG. 1 is a perspective view of a prior art optical system showing a two-axis curvature of a Fresnel lens.
Figure 2:
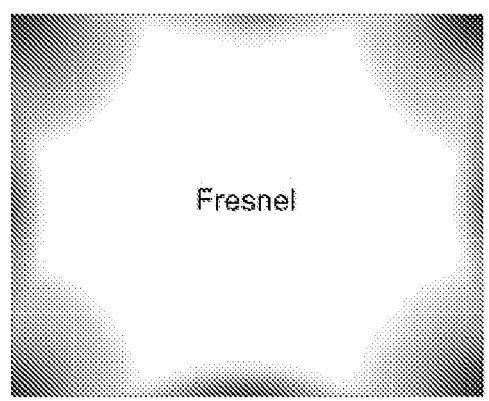
FIG. 2 illustrates the zones of most pronounced distortion associated with the prior art system shown in FIG. 1.
Figure 3A:
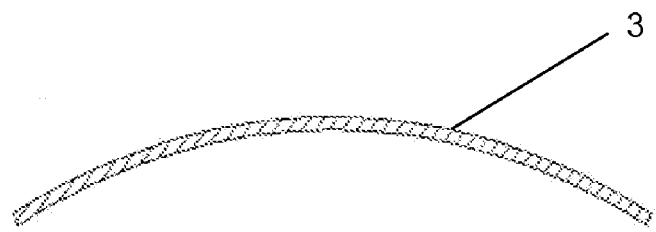
FIG. 3a is a cross-sectional view of the Fresnel lens of the prior art system shown in FIG. 1.

Referring to FIG. 3 of the drawings, there is illustrated in FIG. 3a a cross-section of the Fresnel lens 3 of the prior art system referred to above. As shown, the curvature of the lens is substantially uniform across the width of the lens. FIG. 3a shows the curvature of the lens in a single plane only. As described above with reference to FIG. 1, the lens is also curved in a transverse direction, so that a cross-section taken in a transverse plane has a similar cross-section.

Figure 3B:
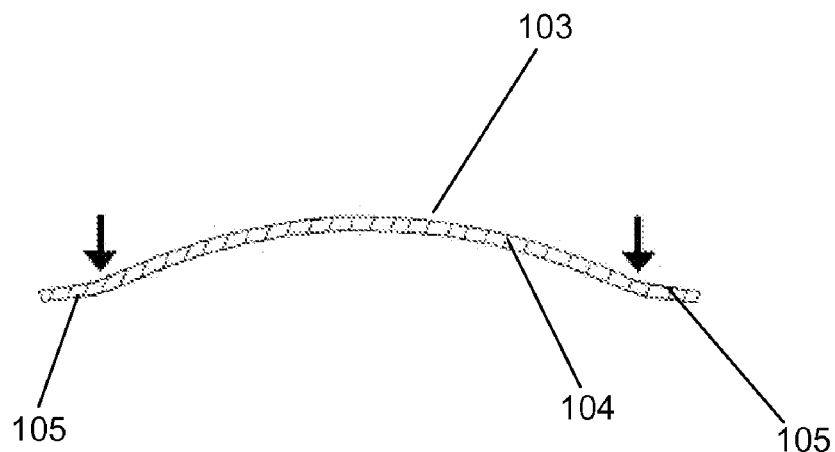
FIG. 3b is a cross-sectional view of the Fresnel lens of the depth-enhancing screen according to the present disclosure.

A cross-section of the Fresnel lens 3 of the depth-enhancing screen according to one embodiment of the present disclosure is shown in FIG. 3b. The lens 103 is arranged with a primary curvature 104 across a central portion of the lens, that is, the cross section of the lens is arcuate or curved in shape. The lens is also provided with a secondary curvature 105 at outer portions thereof as indicated by the arrows. The radius of the secondary curvature is greater than the radius of the primary curvature. The secondary curvature modifies the primary curvature to reduce distortion effects at the edges of the lens. As with FIG. 3a, FIG. 3b shows the primary and secondary curvatures of the lens in a single plane only. As described above with reference to FIG. 1, the lens is also curved in a transverse direction, so that a cross-section taken in a transverse plane has a similar cross-section.

Figure 4:
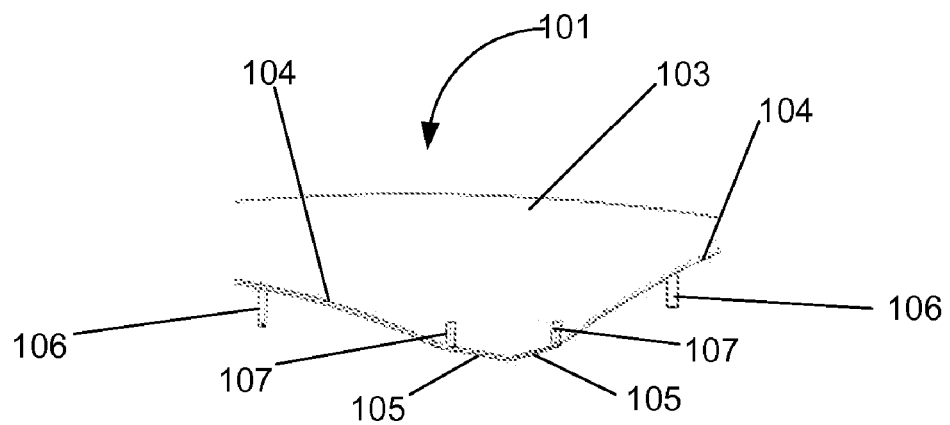
FIG. 4 is a detail perspective view of a first embodiment of the present disclosure.

In one embodiment shown in FIG. 4, a depth-enhancing screen 101 comprises a Fresnel lens 103 arranged such that it has two primary curvatures 104. Thus, there are two planes orthogonal to one another, in which the cross section of the Fresnel lens is arcuate or curved. The lens 103 is arranged such that it has a secondary curvature 105 at its outer portions in both of the planes. The secondary curvature 105 is introduced into the lens 103 by modifying the primary curvature 104 near the edges of the lens.

The curvatures 104, 105 are introduced into the Fresnel lens 103 by means of supports 106, 107 provided along the edges of the Fresnel. A first support 106 is provided approximately midway along each edge of the Fresnel lens 103. Further supports (or fasteners) 107 are provided near, but not at, each corner of the lens 103. The supports 107 attach the lens to the frame (not shown) to modify the curvature of the lens. The opposing forces exerted on the Fresnel lens 103 by the supports 106, 107 cause the lens to exhibit primary curvatures 104 in two orthogonal planes or directions and secondary curvatures 105 in each plane at outer portions near the corners of the lens.

In one specific example, the Fresnel lens 103 is approximately 365 mm wide, 295 mm tall and 1.8 mm thick. The focal length of the lens is preferably between 255 mm and 560 mm. The supports 106 positioned on the longer sides of the lens are between 14 and 21 mm in length and the supports 106 on the shorter sides of the lens are between 6 and 14 mm long. The outer supports 107 may be provided between 9.5 and 13 mm from the corners on the longer sides of the lens and between 7.5 and 11 mm from the corners on the shorter sides of the lens. These supports need not be positioned on the edges of the lens; they may be located slightly inside the perimeter. The radius of the primary curvature of the lens on the longer side is approximately 515 mm and the radius of the primary curvature of the lens on the shorter side is approximately 470 mm. The radius of the secondary curvature is approximately 30 m in both directions. The outer portions of the lens are thus almost flat.

Figure 5:
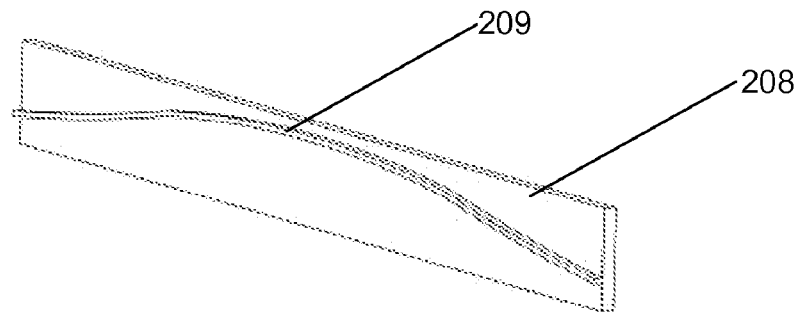
FIG. 5 is a perspective view of a portion of a frame according to a second embodiment of the present disclosure.

In an alternative embodiment, the primary curvature and the secondary curvature are achieved by means of a frame 208 comprising a lip 209, a portion of which is shown in FIG. 5. The Fresnel lens may be arranged within the frame 208 such that an edge thereof is in contact with the lip 209. The lip 209 has a primary curvature at a centre portion thereof and a secondary curvature at the edge portions thereof. When the Fresnel is arranged within the frame 208, the lip 209 shapes the Fresnel lens accordingly. In another embodiment, a groove is provided, such that the edge of the Fresnel may be inserted into the groove and retained in the desired shape.

Figure 6:
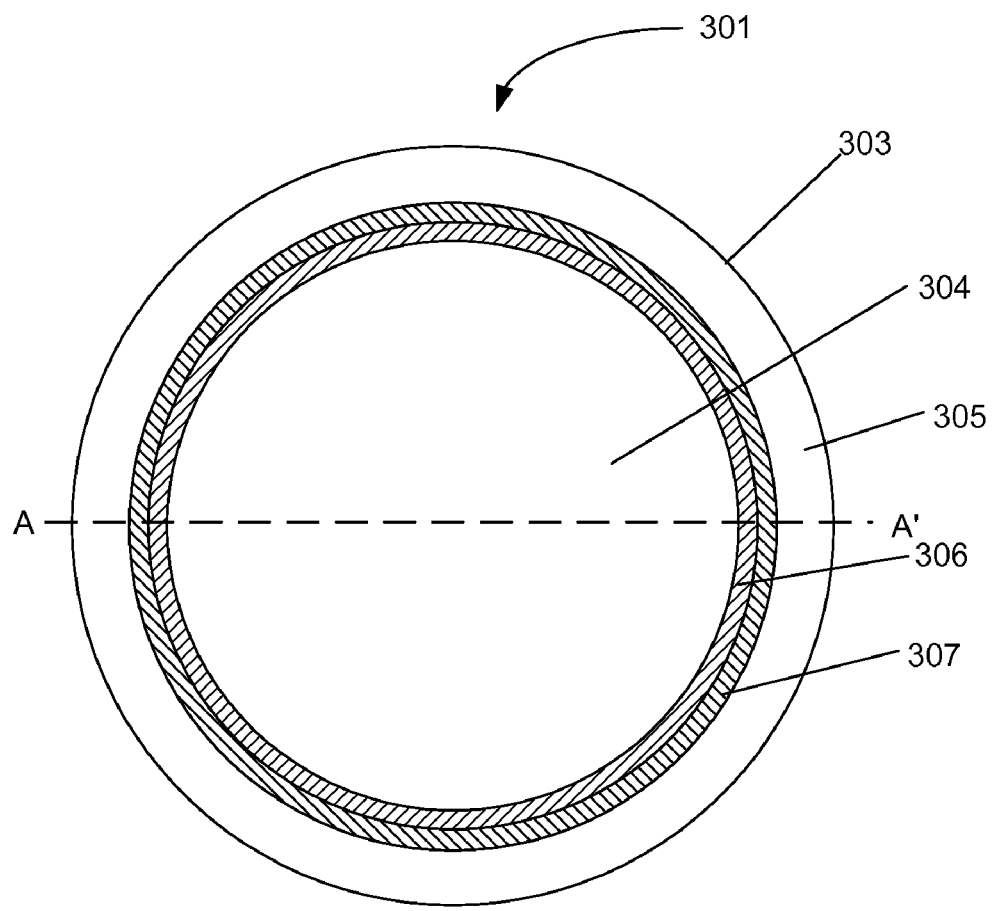
FIG. 6 is a front view of a third embodiment of the present disclosure.
Figure 7:
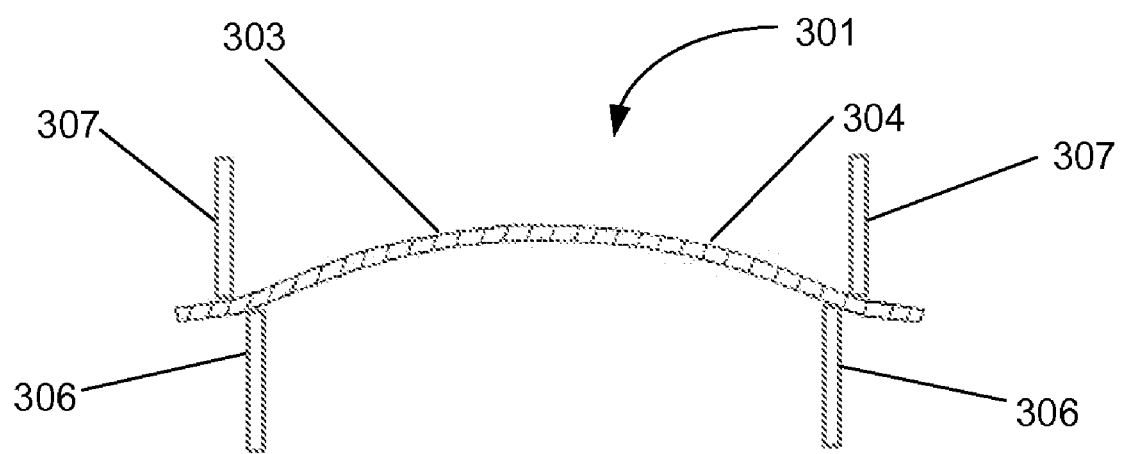
FIG. 7 is a cross-sectional view of the embodiment of FIG. 6, taken along line AA'.

FIGS. 6 and 7 show an embodiment of the depth-enhancing screen 301, comprising a circular Fresnel lens 303. The lens is arranged between concentric rings 306 and 307 such that it has a primary curvature 304. To create the primary curvature, the lens 303 rests against outer ring 307 and ring 306 is pressed (by means of a clamp or similar device) towards ring 307. The primary curvature 304 renders the central portion of the Fresnel lens substantially dome shaped, that is, it has a plurality of primary curvatures, such that there are a plurality of planes transverse to one another in which the cross section of the Fresnel lens is arcuate or curved in shape. One such cross-section is shown in FIG. 7. However, any cross-section taken in a plane that passes through the centre of lens 303 will be similar in shape. Because the rings 306, 307 are positioned a short distance from the edges of the lens 303, the outer portions of the lens are relatively unstressed and exhibit a secondary curvature 305.

In use, the depth-enhancing screen of the present disclosure is arranged in front of a display screen or other emissive image source, such as a television screen or a computer monitor. The lensed side of the Fresnel lens is directed towards the display screen and the smooth side of the Fresnel is directed towards the viewer. The lens is convex towards the viewer. Because the Fresnel lens is curved in two transverse planes, slightly different images are received by the left and right eyes of the viewer, producing a stereoptic effect, which is interpreted by the brain so that the image appears to have depth, that is, the image appears three-dimensional. Because the edges and corners of the Fresnel lens are not subjected to significant stresses, the distortion at these regions is reduced over prior art arrangements, giving an improved depth-enhanced image.

The words "comprises/comprising" and the words "having/including" when used herein with reference to the present disclosure are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A depth-enhancing screen for producing a simulated 3D image, comprising:
a multi-curved Fresnel lens which when viewed in cross-section along the longest line linking two points on the edge of the lens, has a curved cross-section with an apex in the central region of the lens, and wherein each end of the curve flattens before it reaches the edge of the lens.

2. A depth-enhancing screen as claimed in claim 1 wherein the lens is polygonal in shape when flat.

3. A depth-enhancing screen as claimed in claim 2, wherein the Fresnel lens is square in shape when flat and comprises two longest lines, each line linking diagonally opposite corners of the lens.

4. A depth-enhancing screen as claimed in claim 2, wherein the Fresnel lens is rectangular when flat and comprises two longest lines, each line linking diagonally opposite corners of the lens.

5. A depth-enhancing screen as claimed in claim 2, wherein the Fresnel lens is triangular in shape and comprises three longest lines, each line linking adjacent corners of the lens.

6. A depth-enhancing screen as claimed in claim 2 comprising at least one rounded corner.

7. A depth-enhancing screen as claimed in claim 1, wherein the Fresnel lens comprises at least one curved edge.

8. A depth-enhancing screen as claimed in claim 1, wherein the Fresnel lens is circular in shape when flat and comprises multiple longest lines, wherein each longest line is a diameter of the circle.

9. The depth-enhancing screen of claim 1 wherein said lens has a curved cross-section when viewed in cross-section along a second line substantially perpendicular to the longest line, the second curve having an apex in the central region of the lens, and wherein each end of the second curve flattens before it reaches the edge of the lens.

10. A depth-enhancing screen as claimed in claim 9 wherein the Fresnel lens is oval in shape when flat wherein the longest line is the oval's major axis and the second line is the oval's minor axis.

11. A depth-enhancing screen as claimed in claim 1, further comprising a frame, wherein the Fresnel lens is mounted in the frame.

12. A depth-enhancing screen as claimed in claim 11, wherein the Fresnel lens is mounted in the frame such that the curved cross-section is introduced into the lens by means of the mounting arrangement.

13. A depth-enhancing screen as claimed in claim 11, wherein the Fresnel lens is rectangular when flat and the frame is rectangular, and wherein a rim or rim segment is provided on each side of the frame to shape the corresponding edge of the lens.

14. A depth-enhancing screen as claimed in claim 1, wherein the curves in the Fresnel lens are achieved by application of forces to both surfaces of the lens.

15. A depth-enhancing screen as claimed in claim 14, wherein the forces are applied in at least one region adjacent an edge of the lens.

16. A depth-enhancing screen as claimed in claim 15, wherein said lens is polygonal in shape when flat and wherein said forces are applied either side of each corner of the lens.

17. A depth-enhancing screen as claimed in claim 1, wherein the Fresnel lens is circular when flat, the screen further comprising:
a pair of concentric circular frames, wherein each frame is in contact with one surface of the lens, the frames arranged such that the first frame exerts a force on a first surface of the lens, and the second frame exerts a force on the other surface of the lens to obtain the lens's cross-sectional curves.

18. A depth-enhancing screen as claimed in claim 1, wherein the frame comprises a rim or a groove and the Fresnel lens is mounted in the frame such that the rim or groove shapes an edge of the lens to impart the curves to the lens.

19. A depth-enhancing screen as claimed in claim 18, wherein the rim or groove has a primary curvature at a central portion thereof and a secondary curvature at an outer portion thereof.

20. An optical system comprising a depth-enhancing screen comprising:
a multi-curved Fresnel lens which when viewed in cross-section along the longest line linking two points on the edge of the lens, has a curved cross-section with an apex in the central region of the lens, and wherein each end of the curve flattens before it reaches the edge of the lens; and
additional optical elements.

21. A method of producing a depth-enhancing screen for producing a simulated 3D image, comprising:
providing a substantially flat Fresnel lens;
applying opposing inward and outward forces to regions of the Fresnel lens to bend the lens into a multi-curved Fresnel lens which when viewed in cross-section along the longest line linking two points on the edge of the lens, the lens has a curved cross-section with an apex in the central region of the lens, and wherein each end of the curve flattens before it reaches the edge of the lens.

22. A method as claimed in claim 21 wherein said step of applying inward forces to the lens comprises applying force to either side of each corner of the lens, leaving the actual corner unconstrained.

* * * * *